United States Patent
Gore

(10) Patent No.: US 7,968,166 B2
(45) Date of Patent: Jun. 28, 2011

(54) OPTICAL RECORDING SYSTEM

(75) Inventor: Makarand P. Gore, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1186 days.

(21) Appl. No.: 11/668,438

(22) Filed: Jan. 29, 2007

(65) Prior Publication Data
US 2007/0179057 A1 Aug. 2, 2007

Related U.S. Application Data

(63) Continuation-in-part of application No. 11/344,352, filed on Jan. 31, 2006.

(51) Int. Cl.
*B32B 3/02* (2006.01)
(52) U.S. Cl. .................. 428/64.9; 503/221
(58) Field of Classification Search ............ 428/64.4, 428/64.8, 64.9; 503/221
See application file for complete search history.

(56) References Cited

U.S. PATENT DOCUMENTS

| | | | | |
|---|---|---|---|---|
| 3,789,421 | A | * | 1/1974 | Chivian et al. ............ 347/262 |
| 5,100,711 | A | * | 3/1992 | Satake et al. ............. 428/64.8 |
| 6,329,035 | B1 | | 12/2001 | Iwasaki et al. |
| 2003/0108708 | A1 | * | 6/2003 | Anderson et al. ........ 428/64.4 |
| 2004/0146812 | A1 | * | 7/2004 | Gore et al. ................ 430/343 |
| 2005/0036768 | A1 | | 2/2005 | Matsuishi et al. |
| 2005/0075248 | A1 | | 4/2005 | Gore et al. |

FOREIGN PATENT DOCUMENTS

| | | |
|---|---|---|
| EP | 1583089 | 10/2005 |
| WO | WO 2004064053 A1 * | 7/2004 |
| WO | WO 2004/075248 | 8/2004 |

* cited by examiner

*Primary Examiner* — Mark Ruthkosky
*Assistant Examiner* — Gerard T Higgins

(57) ABSTRACT

Systems and method for optically recording data. One system comprises a disc comprising a substrate and a markable coating on said substrate, the markable coating having a thickness less than 1 μm and comprising: a matrix; and a color-forming agent included in the matrix and comprising a leuco dye and developer; wherein the leuco dye is selected to change from high reflectance of radiation with wavelengths between 400 and 500 nm to low reflectance of radiation with wavelengths between 400 and 500 nm when activated by the application of energy above a threshold level; and a marking light source positioned so as to illuminate the disc in a desired manner.

12 Claims, 2 Drawing Sheets

OPTICAL RECORDING SYSTEM

CROSS-REFERENCE TO RELATED APPLICATIONS

This application is a continuation-in-part of U.S. patent application Ser. No. 11/344,352, filed on Jan. 31, 2006 and entitled "Optical Recording Medium," which is herein incorporated by reference in its entirety.

BACKGROUND

1. Field of the Invention

This invention relates in general to optical recording systems and, in particular, to optical disc recording systems and related recording media. More specifically, but without restriction to the particular embodiments hereinafter described in accordance with the best mode of practice, this invention relates to optical disc media using dyes for information recording, systems for recording information on such media, and various methods relating thereto.

2. General Discussion and Related Art

Materials that produce color change upon stimulation with radiation are used in optical recording devices. Further, widespread adoption of and rapid advances in technologies relating to optical recording media have created a desire for greatly increased data storage capacity in such media. Thus, optical storage technology has evolved from the compact disc (CD) and laser disc (LD) to far denser types such as digital versatile disc (DVD) and blue laser formats such as BLU-RAY. ("BLU-RAY" and the BLU-RAY Disc logo mark are trade-marks of the BLU-RAY Disc Founders, which consists of 13 companies in Japan, Korea, Europe, US.)

In each case, the optical recording medium comprises a substrate, typically a disc, on which is deposited a layer on which a mark can be created. In some media the mark is a "pit," or indentation in the surface of the layer and the spaces between pits are called "lands." A marked disc can be read by directing a laser beam at the marked surface and then detecting changes in the reflected beam.

It remains desirable to improve the mark ability and manufacturability of optical recording media while reducing the cost and complexity thereof.

BRIEF DESCRIPTION OF THE DRAWINGS

For a detailed description of exemplary embodiments of the invention, reference will now be made to the accompanying drawing, which shows an imaging medium according to an embodiment of the present invention.

NOTATION AND NOMENCLATURE

Figure 1:
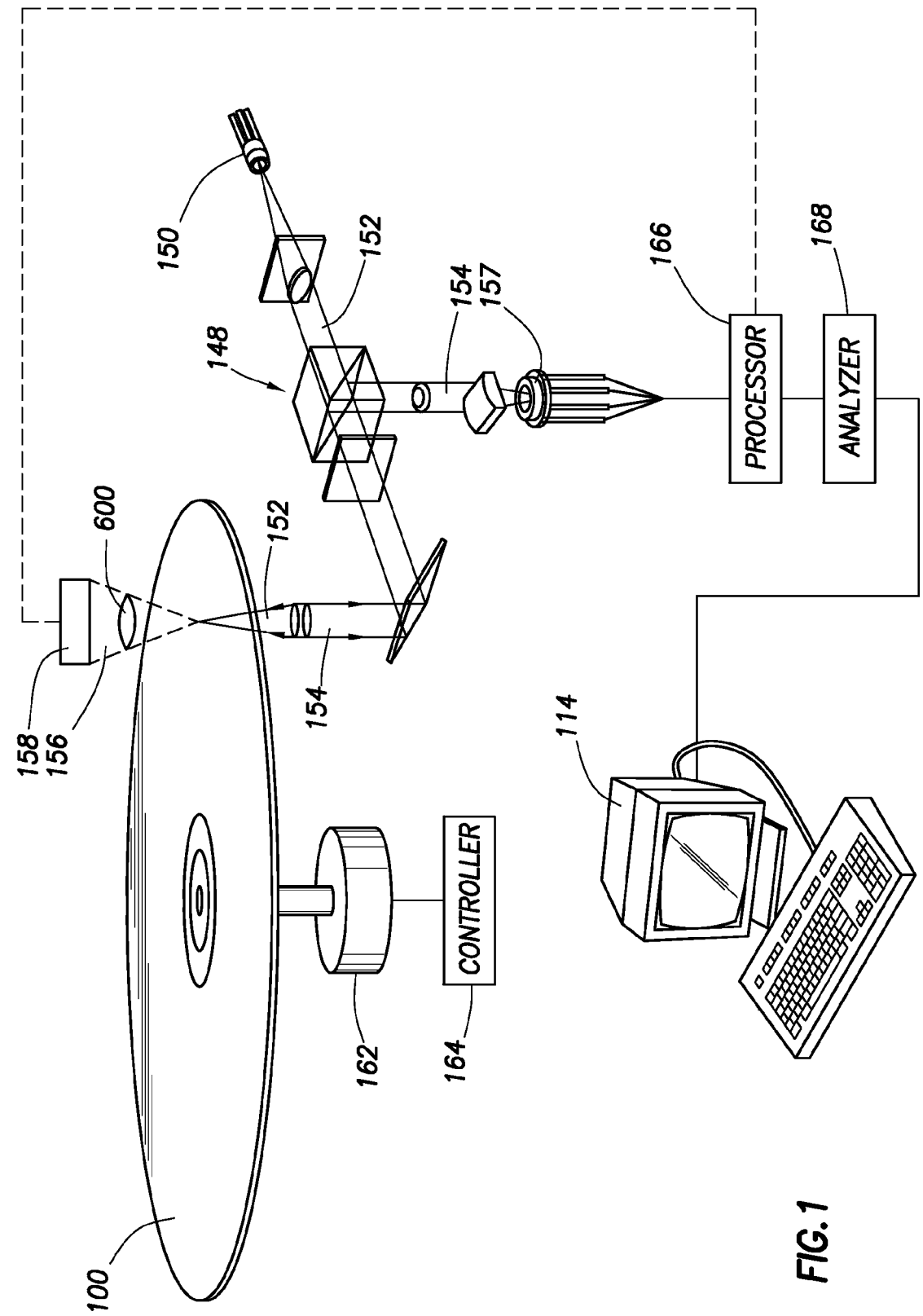
FIG. 1 is a perspective view and block diagram illustrating an optical disc recording system according to the present invention.

Certain term are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "comprising, but not limited to . . . ."

Reference is made herein to BLU-RAY technologies. Technical specifications for BLU-RAY discs include the following:

Wavelength=405 nm
Numerical aperture (NA)=0.85
Disc diameter=12 cm
Disc thickness=1.2 mm, and
Data capacity$\geq$23.3/25/27 GB.

BLU-RAY discs can currently be used to store 2-hours high resolution video images or 13-hours conventional video images. A blue-violet laser having a wavelength of 405 nm is used for the light source for BLU-RAY discs.

As used herein, the term "leuco dye" refers to a color-forming substance that is colorless or one color in a non-activated state and that produces or changes color in an activated state. As used herein, the terms "developer" and "activator" describe a substance that reacts with a dye and causes the dye to alter its chemical structure and change or acquire color.

The terms "absorber" and "antenna" as used herein refer to a light-absorbing compound that is selected for its ability to absorb at a predetermined wavelength or in a predetermined wavelength range. The compound readily absorbs the desired wavelength(s) of radiation, and transfers energy as heat so as to cause or facilitate marking.

The term "light" as used herein includes electromagnetic radiation of any wavelength or band and from any source.

Complete technical details for Blu-Ray discs and related player or recording devices may be found in the particular Blu-ray format books identified below. Additional information can also be found at www.blu-raydisc.info/spec/spec.html.

The following books provide information regarding Blu-Ray Disc Rewritable (RE) Format Version 1:
  (1) System Description Blu-ray Disc Rewritable Part 1: Basic Format Specifications Ver. 1.02 March 2006
  (2) System Description Blu-ray Disc Rewritable Part 2: File System Specifications Ver. 1.00 June 2002
  (3) System Description Blu-ray Disc Rewritable Part 3: Audio Visual Basic Specifications Ver. 1.00 June 2002

The following books provide information regarding Blu-Ray Disc Rewritable (RE) Format Version 2:
  (1) System Description Blu-ray Disc Rewritable Part 1: Basic Format Specifications Ver. 2.11 March 2006, including System Description Blu-ray Disc Hybrid Format Ver. 1.01 (Part 1) December 2005
  (2) System Description Blu-ray Disc Rewritable Part 2: File System Specifications Ver. 2.1 October 2006
  (3) System Description Blu-ray Disc Rewritable Part 3: Audio Visual Basic Specifications Ver. 2.0 March 2005

The following books provide information regarding Blu-Ray Disc Rewritable (RE) Format Version 3:
  (1) System Description Blu-ray Disc Rewritable Part 1: Basic Format Specifications Ver. 2.11 March 2006, including System Description Blu-ray Disc Hybrid Format Ver. 1.01 (Part 1) December 2005
  (2) System Description Blu-ray Disc Rewritable Part 2: File System Specifications Ver. 2.1 October 2006
  (3) System Description Blu-ray Disc Rewritable Part 3: Audio Visual Basic Specifications Ver. 3.0 September 2006, together with System Description Blu-ray Disc Read-Only Part 3: Audio Visual Basic Specifications Ver. 2.0 May 2006

The following books provide information regarding Blu-Ray Disc Recordable (R) Format Version 1:
(1) System Description Blu-ray Disc Recordable Part 1: Basic Format Specifications Ver. 1.11 December 2005, including System Description Blu-ray Disc Hybrid Format Ver. 1.01 (Part 1) December 2005
(2) System Description Blu-ray Disc Recordable Part 2: File System Specifications Ver. 1.1 October 2006
(3) System Description Blu-ray Disc Rewritable Part 3: Audio Visual Basic Specifications Ver. 2.0 March 2005

The following books provide information regarding Blu-Ray Disc Recordable (R) Format Version 2:
(1) System Description Blu-ray Disc Recordable Part 1: Basic Format Specifications Ver. 1.11 December 2005, including System Description Blu-ray Disc Hybrid Format Ver. 1.01 (Part 1) December 2005
(2) System Description Blu-ray Disc Recordable Part 2: File System Specifications Ver. 1.1 October 2006
(3) System Description Blu-ray Disc Rewritable Part 3: Audio Visual Basic Specifications Ver. 3.0 September 2006, together with System Description Blu-ray Disc Read-Only Part 3: Audio Visual Basic Specifications Ver. 2.0 May 2006

The following books provide information regarding Blu-Ray Disc Read-Only (ROM) Format Version 2:
(1) System Description Blu-ray Disc Read-Only Part 1: Basic Format Specifications Ver. 1.3 November 2005, including System Description Blu-ray Disc Hybrid Format Ver. 1.01 (Part 1) December 2005
(2) System Description Blu-ray Disc Read-Only Part 2: File System Specifications Ver. 1.2 December 2005
(3) System Description Blu-ray Disc Read-Only Part 3: Audio Visual Basic Specifications Ver. 2.0 May 2006

The following book provides information regarding Blu-Ray Disc Hybrid Format:
(1) System Description Blu-ray Disc Hybrid Format Ver. 1.01 (Part 1) December 2005

DETAILED DESCRIPTION

FIG. 1 is a representation in perspective and block diagram illustrating optical components 148, a light source 150 that produces the incident or interrogation beam 152, a return beam 154 which is detected by an optical pickup 157 (similar to pickup 264 in FIG. 2), and a transmitted beam 156. In the transmissive optical disc format, the transmitted beam 156 is detected, by a top detector 158 via lens or optical system 600, and is also analyzed for the presence of signal agents. In the transmissive embodiment, a photo detector may be used as a top detector 158.

FIG. 1 also illustrates a drive motor 162 and a controller 164 for controlling the rotation of the optical disc 100. FIG. 1 further shows a processor 166 and analyzer 168 implemented in the alternative for processing the return beam 154 and transmitted beam 156 associated the transmissive optical disc. A display monitor 114 is also provided for displaying the results of the processing.

Figure 2:
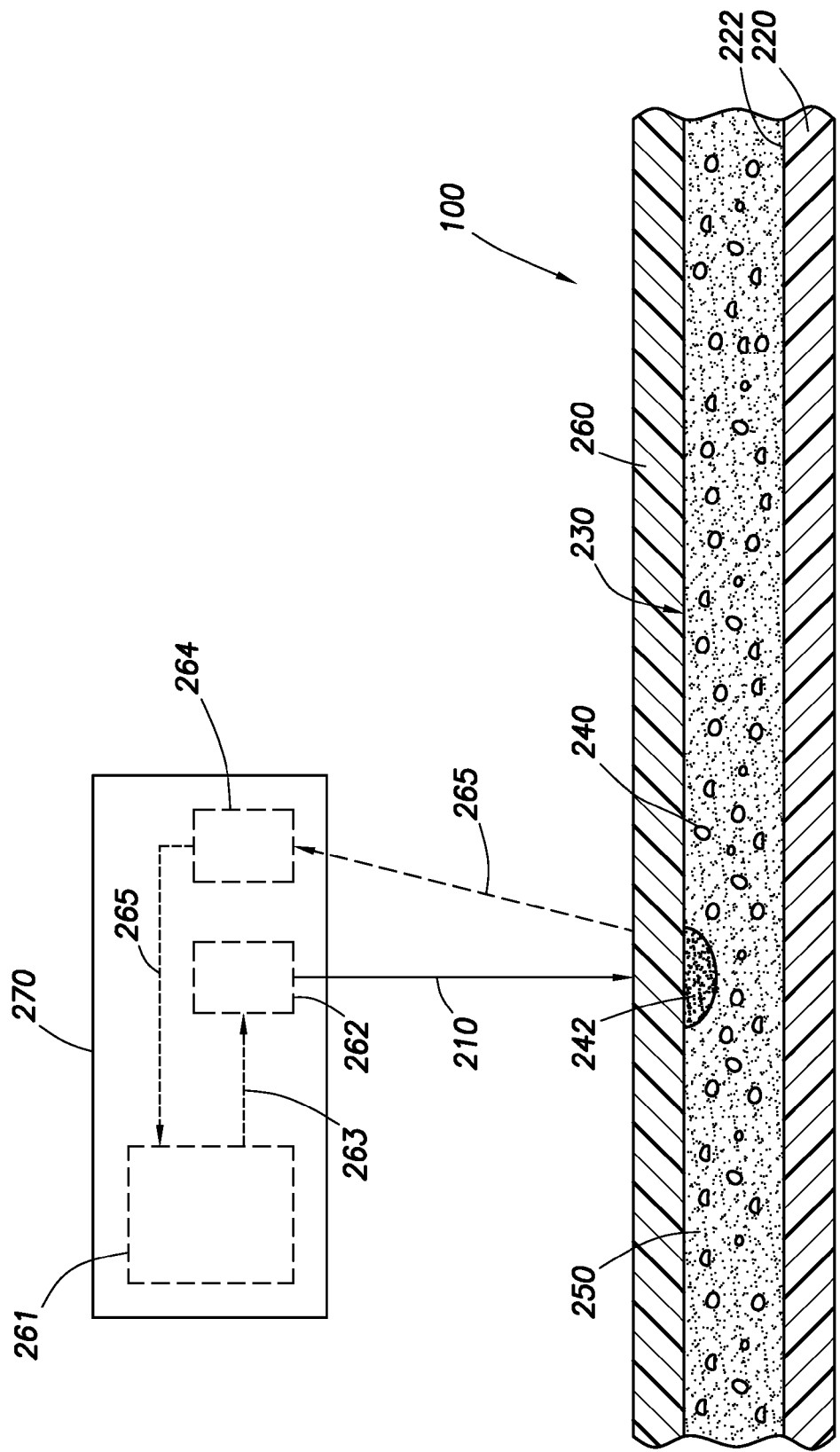
FIG. 2 is a side elevation view of a recordable optical disc according to the present invention shown in conjunction with a partial block diagram of the principal elements of the system represented in FIG. 1.

Referring briefly to FIG. 2, there is shown the imaging medium 100 and an energy beam 210. Imaging medium 100 comprises a substrate 220 and a marking layer 230 on a surface 222 thereof. In the embodiment shown, imaging medium 100 further comprises a protective layer 260.

Substrate 220 may be any substrate upon which it is desirable to make a mark, such as, by way of example only, the polymeric substrate of a CD-R/RW/ROM, DVD±R/RW/ROM, or BLU-RAY disc. Substrate 220 may be paper (e.g., labels, tickets, receipts, or stationery), overhead transparency, or other surface upon which it is desirable to provide marks. Marking layer 230 may be applied to substrate 220 via any acceptable method, such as, by way of example only, rolling, spin-coating, spraying, or screen printing.

In many embodiments, it will be desirable to provide a marking layer 230 that is less than one micron ($\mu$m) thick. In order to achieve this, spin coating is a suitable application technique. In addition, it is necessary to provide a marking composition that is capable of forming a layer having the desired thickness. In such cases, the marking layer should be, inter alia, free from particles that would prevent such a layer, i.e., free from particles having a dimension greater than 1 $\mu$m. The marking composition is preferably either entirely free of particles, or contains particles having an average diameter less than 400 nm, more preferably less than 200 nm, and most preferably less than 100 nm. In other embodiments, the particles, if present, have an average diameter that is less than one-half of the wavelength of the marking radiation.

As described in detail below, marking layer 230 preferably comprises a color-forming agent suspended in a matrix or binder. In the embodiment shown, marking layer 230 includes a matrix 250 and particles 240 suspended therein. Also included in marking layer 230 may be an optional fixing agent and/or an optional radiation-absorbing compound or absorber.

The color-forming agent may be any substance that undergoes a detectable optical change in response to a threshold stimulus, which may be applied in the form of light, heat, or pressure. In some embodiments, the color-forming agent comprises a leuco dye and a developer, as described in detail below. The developer and the leuco dye, when chemically mixed, produce a detectable optical change. Either or both of the developer and the leuco dye may be soluble in the matrix. Thus, in certain embodiments, one of the components (developer or leuco dye) may be suspended in the matrix as distributed particles 240 as illustrated in FIG. 2. Likewise, the optional fixing agent and absorber may each be completely dissolved in the matrix phase or may be present as fine powder or particles dispersed in the matrix phase.

The concentration and distribution of the color-forming agent in marking layer 230 are preferably sufficient to give a mark, when activated, which has a preferred reflectivity signal, or level of contrast, as compared to the background, i.e., unmarked regions. In some embodiments, the difference in reflectivity is determined by comparing the electrical signal from an optical sensor receiving light reflected from a marked portion of the surface to that from an unmarked portion of the surface.

When it is desired to make a mark, marking energy 210 is directed in a desired manner at imaging medium 100. The form of the energy may vary depending upon the equipment available, ambient conditions, and desired result. Examples of energy that may be used include, but are not limited to, infra-red (IR) radiation, ultra-violet (UV) radiation, LASER, Light Emitting Diode, or visible light. In these embodiments, imaging medium 230 is illuminated with light having the desired predetermined wavelength at the location where it is desired to form a mark.

Without subscribing to any particular effect for the radiation, the marking layer, and the absorber, if present, absorbs the energy, thereby causing localized heating and/or a photochemical change in marking layer 230. In certain embodiments, the localized heat may cause matrix 250 and/or suspended particles 240 to melt and further react. If a threshold amount of energy is applied to the desired region of marking layer 230, an optically detectable mark 242 is produced.

In order to achieve a predetermined information density in the markings on the disk, it is often desirable to provide marks that are on the order of less than 1 μm across. This is achieved by using a light source that is capable of forming a spot size less than about 1 μm across, more preferably less than 0.90 μm across, and still more preferably less than 0.50 μm across. Lasers are well-suited to this application. For example, a laser can produce a spot as small as half of the wavelength of the light, although even smaller spots can be produced.

It has been found that certain color-forming agents undergo a shift from relatively high reflectance at a given wavelength to relatively low reflectance at the same wavelength when activated. This may be referred to as a high-to-low reflectance shift. In particular, certain leuco dyes, when reacting with a selected developer, undergo a high-to-low reflectance shift. The resulting radiation-absorbing mark 242 can be detected by an optical sensor, thereby producing an optically readable mark in or on the media device. In other embodiments, the unmarked marking composition may be substantially transparent to the marking radiation, and may become relatively absorbing at a desired wavelength upon activation.

Because many commercial and consumer products use a single wavelength for both read and write operations, and because a color-forming agent that produces a mark that is relatively absorbing (relative to the unmarked regions) at the read wavelength is particularly advantageous, it is desirable to provide a color-forming agent that produces a mark that is relatively absorbing at the write wavelength. Thus, by way of example and not limitation, if blue-violet light (radiation) is to be used as the read radiation, the marks formed in the marking layer are preferably contrasting color, namely yellow to orange, indicating absorption of blue radiation. In certain embodiments, therefore, the marking composition contains a leuco dye that, when activated, changes from being relatively non-absorbing at blue-violet wavelengths to being relatively absorbing at those wavelengths.

Nonetheless, embodiments of the present invention are not limited to such dyes. Specific examples of leuco dyes suitable for use in embodiments of the present invention include, but are not limited to, aminofluorans, which include but are not limited to the one or a combination of the following: 1,2-benzo-6-(N-ethyl-N-toluidino)fluoran, 1,2-benzo-6-(N-methyl-N-cyclohexylamino)fluoran, 1,2-benzo-6-dibutylaminofluoran, 1,2-benzo-6-diethylaminofluran, 2-(.alpha.-phenylethylamino)-6-(N-ethyl-p-toluidino)fluoran, 2-(2,3-dichloroanilino)-3-chloro-6-diethylaminofluran, 2-(2,4-dimethylanilino)-3-methyl-6-diethylaminofluoran, 2-(di-p-methylbenzilamino)-6-(N-ethyl-p-toluidino)fluoran, 2-(m-trichloromethylanilino)-3-methyl-6-(N-cyclohexyl-N-methylamino)fluoran, 2-(m-trichloromethylanilino)-3-methyl-6-diethylanimofluoran, 2-(m-trifluoromethylaniline)-6-diethylaminofluoran, 2-(m-trifluoromethylanilino)-3-chloro-6-diethylaminofluran, 2-(m-trifluoromethylanilino)-3-methyl-6-diethylanimofluoran, 2-(N-ethyl-p-toluidino)-3-methyl-6-(N-ethylanilino)fluoran, 2-(N-ethyl-p-toluidino)-3-methyl-6-(N-propyl-p-toluidino)fluoran, 2-(o-chloroanilino)-3-chloro-6-diethlaminofluran, 2-(o-chloroanilino)-6-dibutylaminofluoran, 2-(o-chloroanilino)-6-diethylaminofluoran, 2-(p-acetylanilino)-6-(N-n-amyl-N-n-butylamino)fluoran, 2,3-dimethyl-6-dimethylaminofluoran, 2-amino-6-(N-ethyl-2,4-dimethylanilino)fluoran, 2-amino-6-(N-ethylanilino)fluoran, 2-amino-6-(N-ethyl-p-chloroanilino)fluoran, 2-amino-6-(N-ethyl-p-ethylanilino)fluoran, 2-amino-6-(N-ethyl-p-toluidino)fluoran, 2-amino-6-(N-methyl-2,4-dimethylanilino)fluoran, 2-amino-6-(N-methylanilino)fluoran, 2-amino-6-(N-methyl-p-chloroanilino)fluoran, 2-amino-6-(N-methyl-p-ethylanilino)fluoran, 2-amino-6-(N-methyl-p-toluidino)fluoran, 2-amino-6-(N-propyl-2,4-dimethylanilino)fluoran, 2-amino-6-(N-propylanilino)fluoran, 2-amino-6-(N-propyl-p-chloroanilino)fluoran, 2-amino-6-(N-propyl-p-ethylanilino)fluoran, 2-amino-6-(N-propyl-p-toluidino)fluoran, 2-anilino-3-chloro-6-diethylaminofluran, 2-anilino-3-methyl-6-(N-cyclohexyl-N-methylamino)fluoran, 2-anilino-3-methyl-6-(N-ethyl-N-isoamylamino)fluoran, 2-anilino-3-methyl-6-(N-ethyl-N-p-benzyl)aminofluoran, 2-anilino-3-methyl-6-(N-ethyl-N-propylamino)fluoran, 2-anilino-3-methyl-6-(N-iso-amyl-N-ethylamino)fluoran, 2-anilino-3-methyl-6-(N-isobutyl-methyl amino)fluoran, 2-anilino-3-methyl-6-(N-isopropyl-methyl amino)fluoran, 2-anilino-3-methyl-6-(N-methyl-p-toluidino-)fluoran, 2-anilino-3-methyl-6-(N-n-amyl-N-ethylamino)fluoran, 2-anilino-3-methyl-6-(N-n-amyl-N-methylamino)fluoran, 2-anilino-3-methyl-6-(N-n-propyl-N-isopropylamino)fluoran, 2-anilino-3-methyl-6-(N-n-propyl-N-methylamino)fluoran, 2-anilino-3-methyl-6-(N-sec-butyl-N-methylamino)fluoran, 2-anilino-3-methyl-6-diethylaminofluoran, 2-anilino-3-methyl-6-di-n-butylaminofluoran, 2-anilino-6-(N-n-hexyl-N-ethylamino)fluoran, 2-benzilamino-6-(N-ethyl-2,4-dimethylanilino)fluoran, 2-benzilamino-6-(N-ethyl-p-toluidino)fluoran, 2-benzilamino-6-(N-methyl-2,4-dimethylanilino)fluoran, 2-benzilamino-6-(N-methyl-p-toluidino)fluoran, 2-bromo-6-diethylaminofluoran, 2-chloro-3-methyl-6-diethylaminofluran, 2-chloro-6-(N-ethyl-N-isoamylamino)fluoran, 2-chloro-6-diethylaminofluoran, 2-chloro-6-dipropylaminofluoran, 2-diethylamino-6-(N-ethyl-p-toluidino)fluoran, 2-diethylamino-6-(N-methyl-p-toluidino)fluoran, 2-dimethylamino-6-(N-ethylanilino)fluoran, 2-dimethylamino-6-(N-methylanilino)fluoran, 2-dipropylamino-6-(N-ethylanilino)fluoran, 2-dipropylamino-6-(N-methylanilino)fluoran, 2-ethylamino-6-(N-ethyl-2,4-dimethylanilino)fluoran, 2-ethylamino-6-(N-methyl-p-toluidino)fluoran, 2-methylamino-6-(N-ethylanilino)fluoran, 2-methylamino-6-(N-methyl-2,4-dimethylanilino)fluoran, 2-methylamino-6-(N-methylanilino)fluoran, 2-methylamino-6-(N-propylanilino)fluoran, 3-(1-ethyl-2-methylindole-3-yl)-3-(2-ethoxy-4-diethylaminophenyl)-4-azaphthalide, 3-(1-ethyl-2-methylindole-3-yl)-3-(2-ethoxy-4-diethylaminophenyl)-7-azaphthalide, 3-(1-ethyl-2-methylindole-3-yl)-3-(2-methyl-4-diethylaminophenyl)-4-azaphthalide, 3-(1-ethyl-2-methylindole-3-yl)-3-(2-methyl-4-diethylaminophenyl)-7-azaphthalide, 3-(1-ethyl-2-methylindole-3-yl)-3-(4-diethylaminophenyl)-4-azaphthalide, 3-(1-ethyl-2-methylindole-3-yl)-3-(4-N-n-amyl-N-methylaminophenyl)-40azaphthalide, 3-(1-methyl-2-methylindole-3-yl)-3-(2-hexyloxy-4-diethylaminophenyl)-4-azaphthalide, 3-(1-ethyl-2-methylindole-3-yl)-3-(2-ethoxy-4-diethylaminophenyl)-4-azaphthalide, 3-(N-cyclohexyl-N-methylamino)-6-methyl-7-phenylaminofluoran, 3-(N-ethyl-N-isoamylamino)-6-methyl-7-phenylaminofluoran, 3-(N-ethyl-p-toluidino)-6-methyl-7-phenylaminofluoran, 3,3-bis(2-ethoxy-4-diethylaminphenyl)-4-azaphthalide, 3,3-bis(2-ethoxy-4-diethylaminphenyl)-7-azaphthalide, 3,6-dibutoxyfluoran, 3,6-diethoxyfluoran, 3,6-dimethoxyfluoran, 3-bromo-6-cyclohexylaminofluoran, 3-chloro-6-cyclohexylaminofluoran, 3-dibutylamino-7-(o-chloro-phenylamino)fluoran, 3-diethylamino-5-methyl-7-dibenzylaminofluoran, 3-diethylamino-6-(m-trifluoromethylanilino)fluoran, 3-diethylamino-6,7-dimethylfuoran, 3-diethylamino-6-methyl-7-xylidinofluoran, 3-diethylamino-7-(2-carbomethoxy-phenylamino)fluoran, 3-diethylamino-7-(N-acetyl-N-methylamino)fluoran, 3-diethylamino-7-(N-chloroethyl-N-methylamino)fluoran, 3-diethylamino-7-(N-methyl-N-benzylamino)fluoran, 3-diethylamino-7-(o-chlorophenylamino)fluoran, 3-diethylamino-7-chlorofluoran, 3-diethylamino-7-dibenzylaminofluoran, 3-diethylamino-7-diethylaminofluoran, 3-diethylamino-7-N-methylaminofluoran, 3-dimethylamino-6-methoxylfluoran, 3-dimethylamino-7-methoxyfluoran, 3-methyl-6-(N-ethyl-p-toluidino)fluoran, 3-piperidino-6-methyl-7-phenylaminofluoran, 3-pyrrolidino-6-methyl-7-p-butylphenylaminofluoran, and 3-pyrrolidino-6-methyl-7-phenylaminofluoran.

Additional dyes that may be alloyed in accordance with embodiments of the present invention include, but are not limited to, leuco dyes such as fluoran leuco dyes and phthalide color formers as described in "The Chemistry and Applications of Leuco Dyes," Muthyala, Ramiah, ed., Plenum Press (1997) (ISBN 0-306-45459-9) which is herein incorporate by reference in its entirety. Embodiments may comprise almost any known leuco dye, including, but not limited to, fluorans, phthalides, amino-triarylmethanes, aminoxanthenes, aminothioxanthenes, amino-9,10-dihydro-acridines, aminophenoxazines, aminophenothiazines, aminodihydrophenazines, aminodiphenylmethanes, aminohydrocinnamic acids (cyanoethanes, leuco methines) and corresponding esters, 2(p-hydroxyphenyl)-4,5-diphenylimidazoles, indanones, leuco indamines, hydrozines, leuco indigoid dyes, amino-2,3-dihydroanthraquinones, tetrahalo-p, p'-biphenols, 2(p-hydroxyphenyl)-4,5-diphenylimidazoles, phenethylanilines, and mixtures thereof. In other embodiments, the leuco dye may comprise a fluoran, phthalide, aminotriarylmethane, or mixtures thereof.

Particularly suitable leuco dyes include: 2'-Anilino-3'-methyl-6'-(dibutylamino)-fluoran:

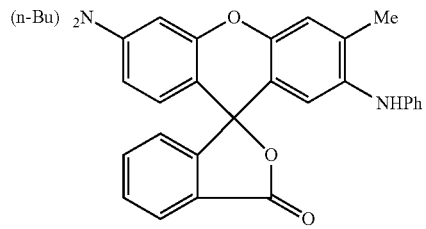

2-Anilino-3-methyl-6-(N-ethyl-N-isoamylamino)fluoran:

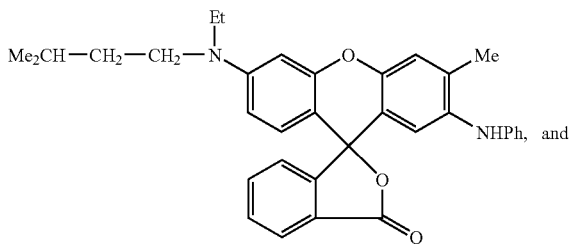

2-Anilino-3-methyl-6-(di-n-amylamino)fluoran:

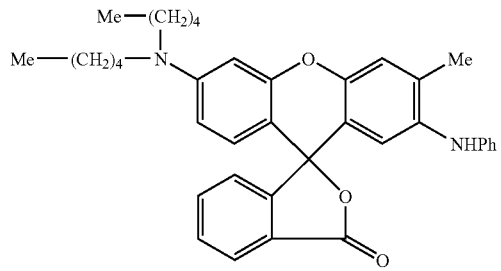

All three dyes are commercially available from Nagase Co of Japan. Additional examples of dyes include: Pink DCF CAS#29199-09-5; Orange-DCF, CAS#21934-68-9; Red-DCF CAS#26628-47-7; Vemmilion-DCF, CAS#117342-26-4; Bis(dimethyl)aminobenzoyl phenothiazine, CAS# 1249-97-4; Green-DCF, CAS#34372-72-0; chloroanilino dibutylaminofluoran, CAS#82137-81-3; NC-Yellow-3 CAS#36886-76-7; Copikem37, CAS#144190-25-0; Copikem3, CAS#22091-92-5, available from Hodogaya, Japan or Noveon, Cincinnati, USA.

Several non-limiting examples of suitable fluoran-based leuco dyes include: 3-diethylamino-6-methyl-7-anilinofluoran, 3-(N-ethyl-p-toluidino)-6-methyl-7-anilinofluoran, 3-(N-ethyl-N-isoamylamino)-6-methyl-7-anilinofluoran, 3-diethylamino-6-methyl-7-(o,p-dimethylanilino)fluorane, 3-pyrrolidino-6-methyl-7-anilinofluoran, 3-piperidino-6-methyl-7-anilinofluoran, 3-(N-cyclohexyl-N-methylamino)-6-methyl-7-anilinofluoran, 3-diethylamino-7-(m-trifluoromethylanilino)fluoran, 3-dibutylamino-6-methyl-7-anilinofluoran, 3-diethylamino-6-chloro-7-anilinofluoran, 3-dibutylamino-7-(o-chloroanilino)fluoran, 3-diethylamino-7-(o-chloroanilino)fluoran 3-di-n-pentylamino-6-methyl-7-anilinofluoran, 3-di-n-butylamino-6-methyl-7-anilinofluoran, 3-(n-ethyl-n-isopentylamino)-6-methyl-7-anilinofluoran, 3-pyrrolidino-6-methyl-7-anilinofluoran, 1(3H)-isobenzofluranone, 4,5,6,7-tetrachloro-3,3-bis[2-[4-(dimethylamino)phenyl]-2-(4-methoxyphenyl)ethenyl]fluoran, and mixtures thereof. Aminotriarylmethane leuco dyes may also be used in embodiments of the present invention such as tris(N,N-dimethylaminophenyl)methane (LCV); tris(N,N-diethylaminophenyl)methane (LECV); tris(N,N-di-n-propylaminophenyl)methane (LPCV); tris(N,N-di-n-butylaminophenyl)methane (LBCV); bis(4-diethylaminophenyl)-(4-diethylamino-2-methyl-phenyl) methane (LV-1); bis(4-diethylamino-2-methylphenyl)-(4-diethylamino-phenyl)methane (LV-2); tris(4-diethylamino-2-methylphenyl)methane (LV-3); bis(4-diethylamino-2-methylphenyl)(3,4-diemethoxyphenyl)methane (LB-8); aminotriarylmethane leuco dyes having different alkyl substituents bonded to the amino moieties wherein each alkyl group is independently selected from C1-C4 alkyl; and aminotriaryl methane leuco dyes with any of the preceding named structures that are further substituted with one or more alkyl groups on the aryl rings wherein the latter alkyl groups are independently selected from C1-C3 alkyl. Generally, the melting point of a mixture of dyes is lower than the higher melting dye (melting point depression) based on mole fraction of low melting dye. In some embodiments, the marking layer comprises two kinds of dye whose melting points are at least 50° C. apart.

Developers suitable for use in the present invention include, without limitation, proton donors, for example acidic phenolic compounds such as bisphenol-A, bisphenol-S, p-hydroxy benzyl benzoate, TG-SA (phenol, 4,4'-sulfonylbis[2-(2-propenyl)]) and poly-phenols.

Additional developers include, but are not limited to, sulfonamides, such as sulfonyl urea. Marking layers that comprise sulfonamides show excellent image stability due to unique complexes and structures formed upon reaction with certain color formers, such as fluoran color formers, resulting in stable color and images. Other suitable sulfonamide developers include, without limitation, benzenesulfonamide, N,N'-[methylenebis(4,1-phenyleneiminocarbonyl)]4,4'-Bis(p-toluenesulfonylaminocarbonylamino)diphenylmethane; 4,4'-Bis(p toluenesulfonylaminocarboxylamino)diphenylmethane; 4,4'-Bis(p-tolylsulfonylureido)diphenylmethane (BTUM); N-(p-toluenesulfonyl)-N'-(3-p-toluenesulfonyloxy-phenyl)urea; 4,4'-bis[(4-methyl-3-phenoxycarbonylaminophenyl)ureido]diphenyl sulfone color developer, 4,4'-bis[(4-methyl-3-phenoxycarbonylaminophenyl)ureido] diphenyl sulfone; 4,4'-bis(N-p-tolylsulfonylaminocarbonylamino)diphenylmethane, N-p-tolylsulfonyl-N'-3-(p-tolylsulfonyloxy)phenyl urea, 4,4'-bis [(4-methyl-3-phenoxycarbonylaminophenyl)ureido] diphenyl sulfone, 2,2-bis[4-(4-methyl-3-phenylureidophenyl)aminocarbonyloxyphenyl]propane, and 4-(p-tolylsulfonylamino)phenol. Other suitable developers may be characterized by Formulas I-IV below.

Formulas I-III

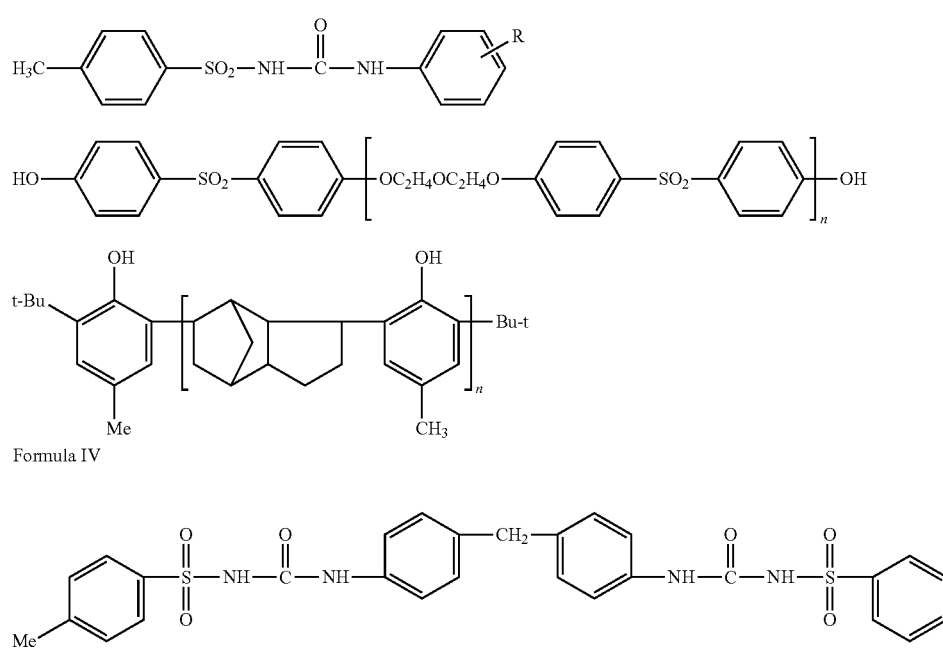

Formula IV that component of the color-forming agent in the lacquer at ambient conditions is so low, that no or very little color change occurs due to reaction of the dye and the developer at ambient conditions. Thus, in some embodiments, the developer is dissolved in the matrix with the dye being present as small crystals suspended in the matrix at ambient conditions; while in other embodiments, the color-former is dissolved in the matrix and the developer is present as small crystals suspended in the matrix at ambient conditions. In some embodiments the particle size is preferably less than 400 nm, more preferably less than 100 nm, or alternatively less than one-half of the wavelength of the marking radiation. These embodiments may be referred to as dispersion "microemulsions." In embodiments in which both the developer and the dye are soluble in the matrix at ambient conditions, the matrix and both components will be in a single phase at ambient conditions.

In some embodiments of the present invention, the color-forming composition includes a metal salt activator. The metal salt activator may be a metal salt of an aromatic carboxylic acid. Metals suitable for use in embodiments of the present invention include transition metals such as zinc, tin, nickel, and iron. In certain embodiments, the metal salt activator can be a zinc salt of an aromatic carboxylic acid. In another embodiment, the carboxylic acid can be a salicylic acid. By way of example only, zinc 3,5-di-t-butyl salicylate is one suitable metal salt activator. Other suitable metal salt activators include, without limitation, zinc salicylate, tin salicylate, zinc 2-hydroxy naphthoate, 3,5-di-α-methylbenzyl zinc salicylate, metal salts of rhodanate, xanthate, aluminate, titanate, and zirconate, and mixtures thereof. If present, the metal salt activator can comprise from about 1 wt % to about 40 wt % of the color-forming composition. Although amounts outside this range can be successfully used depending on the other components of the composition, amounts of from about 5 wt % to about 20 wt % frequently provide adequate results.

As mentioned above, when the color-forming agent comprises a color former and a developer, such as in the case of a leuco dye, either or both of the developer and the dye may be soluble in the matrix at ambient conditions. The other may be substantially insoluble in the matrix at ambient conditions. By "substantially insoluble," it is meant that the solubility of The leuco dye may also be present as a separate phase in the form of a low-melting eutectic. The eutectic may comprise an alloy of fluoran dye and a melting aid. Melting aids, also referred to as "accelerators," may include crystalline organic solids with melting temperatures in the range of about 50° C. to about 150° C., and more specifically, in the range of about 70° C. to about 120° C. Suitable accelerators may include aromatic hydrocarbons (or their derivatives) which provide good solvent characteristics for leuco dye. The melting aid assists in reducing the melting temperature of the leuco dye and stabilizes the leuco dye alloy in the amorphous state (or slows the recrystallization of the leuco dye alloy into individual components). Suitable melting aids for use in embodiments of the current invention include, but are not limited to, m-terphenyl, p-benzyl biphenyl, y-naphthol, and 1,2[bis(3,4] dimethylphenyl)ethane. Other species that may stabilize amorphous phase in leuco dye melts include polymeric species such as acrylate or methacrylate polymers or co-polymers. More generally, any polymeric species soluble in hot leuco dye melt has the potential to act as an amorphous phase stabilizer.

Regardless of the nature of the color-forming agent, an absorber that is tuned to a desired frequency may be included in the marking layer so as to increase absorbance of the available light energy. In some embodiments, the absorber is tuned to the frequency of the light source that will be used to create the desired marks. By effectively absorbing the available light, the absorber increases the heating effect of the laser, thereby enhancing the thermochromic response. The absorbers are chosen on basis of their UV spectra and designed by modification of structure. Small tuning can be effected by changes in matrix polarity, pH and solubility.

Without limitation, the absorber may be selected from the following compounds. For use with a 780 nm laser, preferred dyes include:

(A) silicon 2,3 naphthalocyanine bis(trihexylsilyloxide) (Formula 1) (Aldrich 38,993-5, available from Aldrich, P.O. Box 2060, Milwaukee, Wis. 53201), and matrix soluble derivatives of 2,3 naphthalocyanine (Formula 2)

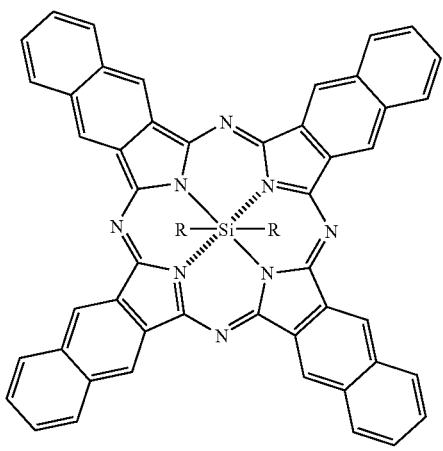

(1)

where R=—O—Si—(CH$_2$(CH$_2$)$_4$CH$_3$)$_3$;

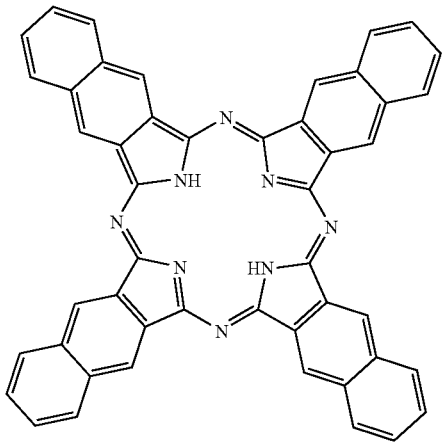

(2)

(B) matrix soluble derivatives of silicon phthalocyanine, described in Rodgers, A. J. et al., 107 J. PHYS. CHEM. A 3503-3514 (May 8, 2003), and matrix soluble derivatives of benzophthalocyanines, described in Aoudia, Mohamed, 119 J. AM. CHEM. SOC. 6029-6039 (Jul. 2, 1997), (substructures illustrated by Formula 3 and Formula 4, respectively):

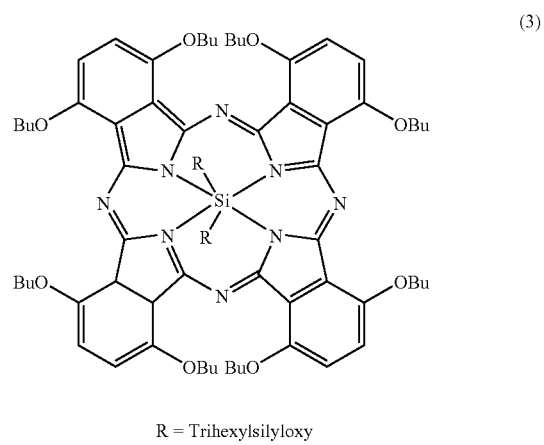

(3)

R = Trihexylsilyloxy

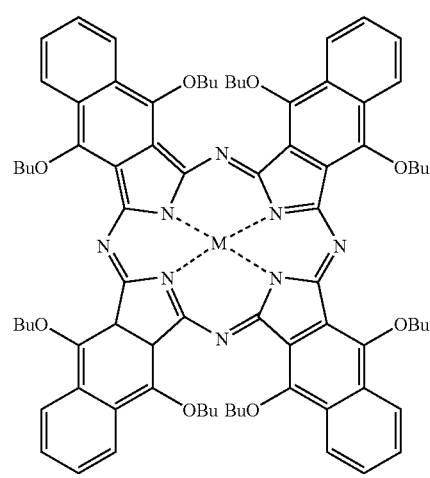

(4)

where M is a metal, and;

(C) compounds such as those shown in Formula 5 (as disclosed in U.S. Pat. No. 6,015,896)

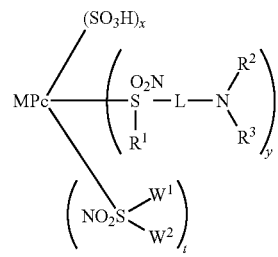

(5)

where M is a metal or hydrogen; Pc is a phthalocyanine nucleus; $R^1$, $R^2$, $W^1$, and $W^2$ are independently H or optionally substituted alkyl, aryl, or aralkyl; $R^3$ is an aminoalkyl group; L is a divalent organic linking group; x, y, and t are each independently 0.5 to 2.5; and (x+y+t) is from 3 to 4;

(D) compounds such as those shown in Formula 6 (as disclosed in U.S. Pat. No. 6,025,486)

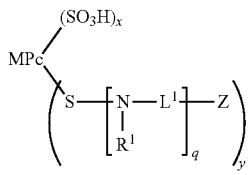

(6)

where M is a metal or hydrogen; Pc is a phthalocyanine nucleus; each $R^1$ independently is H or an optionally substituted alkyl, aryl, or aralkyl; $L^1$ independently is a divalent organic linking group; Z is an optionally substituted piperazinyl group; q is 1 or 2; x and y each independently have a value of 0.5 to 3.5; and (x+y) is from 2 to 5; or (E) 800NP (a proprietary dye available from Avecia, PO Box 42, Hexagon House, Blackley, Manchester M9 8ZS, England), a commercially available copper phthalocyanine derivative.

Additional examples of the suitable radiation absorber can be selected from a number of radiation absorbers such as, but not limited to, aluminum quinoline complexes, porphyrins, porphins, indocyanine dyes, phenoxazine derivatives, phthalocyanine dyes, polymethyl indolium dyes, polymethine dyes, guaiazulenyl dyes, croconium dyes, polymethine indolium dyes, metal complex IR dyes, cyanine dyes, squarylium dyes, chalcogeno-pyryloarylidene dyes, indolizine dyes, pyrylium dyes, quinoid dyes, quinone dyes, azo dyes, and mixtures or derivatives thereof. Other suitable absorbers can also be used in embodiments of the present systems and methods, are known to those skilled in the art, and can be found in such references as *Infrared Absorbing Dyes*, Matsuoka, Masaru, ed., Plenum Press, New York, 1990 (ISBN 0-306-43478-4) and *Near-infrared Dyes for High Technology Applications*, Daehne, Resch-Genger, Wolfbeis, Kluwer Academic Publishers (ISBN 0-7923-5101-0), both of which are incorporated herein by reference.

In addition, exemplary absorber compounds include hybrid absorber packages uniformly distributed/dissolved in at least one and preferably both phase(s) of the coating including two or more absorber dyes.

Further, the radiation absorber also can be selected for optimization of the color forming composition in a wavelength range from about 600 nm to about 720 nm, such as about 650 nm. Non-limiting examples of suitable radiation absorbers for use in this range of wavelengths include: indocyanine dyes such as 3H-indolium-2-[5-(1,3-dihydro-3,3-dimethyl-1-propyl-2H-indol-2-ylidene)-1,3-pentadienyl]-3,3-dimethyl-1-propyl-iodide) (Dye 724 λmax 642 nm), 3H-indolium-1-butyl-2-[5-(1-butyl-1,3-dihydro-3,3-dimethyl-2H-indol-2-ylidene)-1,3-pentadienyl]-3,3-dimethyl-perchlorate (Dye 683 λmax 642 nm), and phenoxazine derivatives such as phenoxazin-5-ium-3,7-bis(diethylamino)-perchlorate ("oxazine 1") λmax=645 nm). Phthalocyanine dyes having a λmax of about the desired development wavelength can also be used, such as silicon 2,3-napthalocyanine bis(trihexylsilyloxide) and matrix-soluble derivatives of 2,3-napthalocyanine (both commercially available from Aldrich Chemical); matrix-soluble derivatives of silicon phthalocyanine (as described in Rodgers, A. J. et al., 107 J. Phys. Chem. A 3503-3514, May 8, 2003), and matrix-soluble derivatives of benzophthalocyanines (as described in Aoudia, Mohamed, 119 J. Am. Chem. Soc. 6029-6039, Jul. 2, 1997); phthalocyanine compounds such as those described in U.S. Pat. Nos. 6,015,896 and 6,025,486, which are each incorporated herein by reference; and Cirrus 715 (a phthalocyanine dye available from Avecia, Manchester, England having a λmax=806 nm).

Laser light having blue and indigo wavelengths from about 300 nm to about 600 nm can be used to develop the color-forming compositions. Therefore, color-forming compositions may be selected for use in devices that emit wavelengths within this range and at a wavelength of about 405 nm in particular. Radiation absorbers that can be useful in the blue (~405 nm) and indigo wavelengths include, but are not limited to, aluminum quinoline complexes, porphyrins, porphins, and mixtures or derivatives thereof. Non-limiting specific examples of suitable radiation absorber can include 1-(2-chloro-5-sulfophenyl)-3-methyl-4-(4-sulfophenyl)azo-2-pyrazolin-5-one disodium salt (λmax=400 nm); ethyl 7-diethylaminocoumarin-3-carboxylate (λmax=418 nm); 3,3'-diethylthiacyanine ethylsulfate (λmax=424 nm); 3-allyl-5-(3-ethyl-4-methyl-2-thiazolinylidene)rhodanine (λmax=430 nm) (each available from Organica Feinchemie GmbH Wolfen), and mixtures thereof.

Non-limiting specific examples of suitable aluminum quinoline complexes include tris(8-hydroxyquinolinato)aluminum (CAS 2085-33-8) and derivatives such as tris(5-cholor-8-hydroxyquinolinato)aluminum (CAS 4154-66-1), 2-(4-(1-methyl-ethyl)-phenyl)-6-phenyl-4H-thiopyran-4-ylidene)-propanedinitril-1,1-dioxide (CAS 174493-15-3), 4,4'-[1,4-phenylenebis(1,3,4-oxadiazole-5,2-diyl)]bis N,N-diphenyl benzeneamine (CAS 184101-38-0), bis-tetraethylammonium-bis(1,2-dicyano-dithiolto)-zinc(II) (CAS 21312-70-9), 2-(4,5-dihydronaphtho[1,2-d]-1,3-dithiol-2-ylidene)-4,5-dihydro-naphtho[1,2-d]1,3-dithiole, all available from Syntec GmbH.

Non-limiting examples of specific porphyrin and porphyrin derivatives include etioporphyrin 1 (CAS 448-71-5), and octaethyl porphrin (CAS 2683-82-1), azo dyes such as Mordant Orange (CAS 2243-76-7), Merthyl Yellow (CAS 60-11-7), 4-phenylazoaniline (CAS 60-09-3), Alcian Yellow (CAS 61968-76-1), available from Aldrich chemical company, and mixtures thereof. In addition, we have used polymethine dyes such as 1,3-Bis-(1,3,3-trimethyl-1,3-dihydro-indol-2-ylidene)-propan-2-one CAS#24293-93-4; 1,3-Dimethyl-5-[2-(3-methyl-oxazolidin-2-ylidene)-ethylidene]-pyrimidine-2,4,6-trione; [4-(2-Benzooxazol-2-yl-vinyl)-phenyl]-dimethyl-amine; 1,3-Dimethyl-5-[2-(1-methyl-pyrrolidin-2-ylidene)-ethylidene]-pyrimidine-2,4,6-trione; 1,3-Dimethyl-5-[2-(3-methyl-thiazolidin-2-ylidene)-ethylidene]-pyrimidine-2,4,6-trione; and 1,3-Dimethyl-5-[2-(3-methyl-oxazolidin-2-ylidene)-ethylidene]-pyrimidine-2,4,6-trione, all available from FEW Chemicals Gmbh, Wolfen, Germany.

The matrix material may be any composition suitable for dissolving and/or dispersing the developer, and color-former (or color-former/melting aid alloy). Acceptable matrix materials include, by way of example only, UV-curable matrices such as acrylate derivatives, oligomers and monomers, with a photo package. A photo package may include a light-absorbing species which initiates reactions for curing of a matrix, such as, by way of example, benzophenone derivatives. Other examples of photoinitiators for free radical polymerization monomers and pre-polymers include, but are not limited to, thioxanethone derivatives, anthraquinone derivatives, acetophenones and benzoine ether types. It may be desirable to choose a matrix that can be cured by a form of radiation other than the type of radiation that causes a color change.

Matrices based on cationic polymerization resins may require photo-initiators based on aromatic diazonium salts, aromatic halonium salts, aromatic sulfonium salts and metallocene compounds. An example of an acceptable matrix or matrices includes Nor-Cote CLCDG-1250A or Nor-Cote CDG000 (mixtures of UV curable acrylate monomers and oligomers), which contains a photoinitiator (hydroxy ketone) and organic solvent acrylates (e.g., methyl methacrylate, hexyl methacrylate, beta-phenoxy ethyl acrylate, and hexamethylene acrylate). Other acceptable matrixs or matrices include acrylated polyester oligomers such as CN292, CN293, CN294, SR351 (trimethylolpropane tri acrylate), SR395 (isodecyl acrylate), and SR256 (2(2-ethoxyethoxy) ethyl acrylate) available from Sartomer Co.

The imaging compositions formed in the manner described herein are applied to the surface of an optical recording medium such as a CD, DVD, Blu-ray disc or the like.

Referring again to the FIG. 2, an exemplary read/write system 270 may include a processor 166, a laser 262, and an optical pickup 264. Signals 263 from processor 166 cause laser 262 to emit light 210 at the desired power level. Light reflected from the disc surface is detected by pickup 264, which in turn sends a corresponding signal 265 back to processor (represented in FIG. 2 as processor 261).

When it is desired to record a disc incorporating an embodiment of the present invention, the disc is positioned such that light 210 emitted by laser 262 is incident on the marking surface. The laser is operated such that the light incident on the marking layer transfers sufficient energy to the surface to cause a mark, such as at 242. Both the laser and the position of the disc are controlled by a processor such that light is emitted by the laser in pulses that form a pattern of marks on the surface of the disc.

When it is desired to read a pattern of marks on the surface of a disc, the disc is again positioned such that light 210 emitted by laser 262 is incident on the marked surface. The laser is operated such that the light incident at the surface does not transfer sufficient energy to the surface to cause a mark. Instead the incident light is reflected from the marked surface to a greater or lesser degree, depending on the absence or presence of a mark. As the disc moves, changes in reflectance are recorded by optical pickup 264 which generates a signal 265 corresponding to the patterns of marks on the marked surface. Both the laser and the position of the disc are controlled by the processor during the reading process.

It will be understood that the read/write system described herein is merely exemplary and comprises components that are understood in the art. Various modifications can be made, including the use of multiple lasers, processors, and/or pickups and the use of light having different wavelengths. The read components may be separated from the write components, or may combined in a single device. In some embodiments, discs incorporating embodiments of the present invention can be used with optical read/write equipment operating at wavelengths between 380 nm and 420 nm.

The above discussion is meant to be illustrative of the principles and various embodiments of the present invention. Numerous variations and modifications will become apparent to those skilled in the art once the above disclosure is fully appreciated. For example, the nature of the substrate may be varied and the marking composition, absorber and matrix may each be varied from those identified herein. Thus while this invention has been described in detail with reference to certain preferred embodiments, it should be appreciated that the present invention is not limited to those precise embodiments. Rather, in view of the present disclosure which describes the current best mode for practicing the invention, many modifications and variations would present themselves to those of skill in the art without departing from the scope and spirit of this invention. For further example, the various marking dyes, methods, and techniques of the present invention many be employed in conjunction of any type of optical disc of types currently in use such as HD-DVD or Blu-ray discs or future types of optical discs not yet available in the market place. The scope of the invention is, therefore, indicated by the following claims rather than by the foregoing description. All changes, modifications, and variations coming within the meaning and range of equivalency of the claims are to be considered within their scope.

What is claimed is:

1. An optical recording system, comprising:
a disc comprising a substrate and a markable coating on said substrate, said markable coating being an optical recording layer and having a thickness less than 1 µm and comprising:
a matrix; and
a color-forming agent included in the matrix and comprising a leuco dye and developer;
wherein said leuco dye is selected to change from high reflectance of radiation with wavelengths between 400 and 500 nm to low reflectance of radiation with wavelengths between 400 and 500 nm when activated by an application of energy above a threshold level;
wherein said color-forming agent includes particles having an average particle size that is less than one-half a wavelength of a marking light source used to apply the energy above the threshold level; and
the marking light source positioned so as to illuminate said disc in a desired manner and selected to form a spot size that is less than about 1 µm across;
wherein the leuco dye is chosen from: 1,2-benzo-6-(N-ethyl-N-toluidino)fluoran, 1,2-benzo-6-(N-methyl-N-cyclohexylamino)fluoran, 1,2-benzo-6-dibutylaminofluoran, 1,2-benzo-6-diethylaminofluran, 2-(.alpha.-phenylethylamino)-6-(N-ethyl-p-toluidino)fluoran, 2-(2,3-dichloroanilino)-3-chloro-6-diethylaminofluran, 2-(2,4-dimethylanilino)-3-methyl-6-diethylaminofluoran, 2-(di-p-methylbenzilamino)-6-(N-ethyl-p-toluidino)fluoran, 2-(m-trichloromethylanilino)-3-methyl-6-(N-cyclohexyl-N-methylamino)fluoran, 2-(m-trichloromethylanilino)-3-methyl -6-diethylanimofluoran, 2-(m-trifluoromethylaniline)-6-diethylaminofluoran, 2-(m-trifluoromethylanilino)-3-chloro-6-diethylaminofluran, 2-(m-trifluoromethylanilino)-3-methyl-6-diethylanimofluoran, 2-(N-ethyl-p-toluidino)-3-methyl -6-(N-ethylanilino)fluoran, 2-(N-ethyl-p-toluidino)-3-methyl-6-(N-propyl-p-toluidino) fluoran, 2-(o-chloroanilino)-3-chloro-6-diethlaminofluran, 2-(o-chloroanilino)-6-dibutylaminofluoran, 2-(o-chloroanilino)-6-diethylaminofluoran, 2-(p-acetylanilino)-6-(N-n-amyl-N-n-butylamino)fluoran, 2,3-dimethyl-6-dimethylaminofluoran, 2-amino-6-(N-ethyl-2,4-dimethylanilino)fluoran, 2-amino-6-(N-ethylanilino)fluoran, 2-amino-6-(N-ethyl-p-chloroanilino)fluoran, 2-amino-6-(N-ethyl-p-ethylanilino)fluoran, 2-amino-6-(N-ethyl-p-toluidino) fluoran, 2-amino-6-(N-methyl-2,4-dimethylanilino) fluoran, 2-amino-6-(N-methylanilino)fluoran, 2-amino-6-(N-methyl-p-chloroanilino)fluoran, 2-amino-6-(N-methyl-p-ethylanilino)fluoran, 2-amino -6-(N-methyl-p-toluidino)fluoran, 2-amino-6-(N-propyl-2,4-dimethylanilino)fluoran, 2-amino-6-(N-propylanilino) fluoran, 2-amino-6-(N-propyl-p-chloroanilino)fluoran, 2-amino-6-(N-propyl-p-ethylanilino)fluoran, 2-amino-6-(N-propyl-p-toluidino)fluoran, 2-anilino-3-methyl-6-(N-cyclohexyl-N-methylamino)fluoran, 2-anilino-3- methyl-6-(N-ethyl--N-isoamylamino)fluoran, 2-anilino -3-methyl-6-(N-ethyl-N-p-benzyl)aminofluoran, 2-anilino-3-methyl-6-(N-ethyl-N-propylamino)fluoran, 2-anilino-3-methyl-6-(N-iso-amyl-N-ethylamino)fluoran, 2-anilino-3-methyl-6-(N-isobutyl-methyl amino)fluoran, 2-anilino -3-methyl-6-(N-isopropyl-methyl amino)fluoran, 2-anilino-3-methyl-6-(N-methyl-p-toluidino-)fluoran, 2-anilino-3-methyl-6-(N-n-amyl-N-ethylamino)fluoran, 2-anilino-3-methyl-6-(N-n-amyl-N-methylamino)fluoran, 2-anilino-3-methyl-6-(N-n-propyl-N-isopropylamino)fluoran, 2-anilino-3-methyl-6-(N-n-propyl-N-methylamino)fluoran, 2-anilino-3-methyl-6-(N-sec-butyl-N-methylamino)fluoran, 2-anilino-3-methyl-6-diethylaminofluoran, 2-anilino-3-methyl-6-di-n-butylaminofluoran,2-anilino-6-(N-n-hexyl-N-ethylamino)fluoran, 2-benzilamino-6-(N-ethyl-2,4-dimethylanilino)fluoran, 2-benzilamino-6-(N-ethyl-p-toluidino)fluoran, 2-benzilamino-6-(N-methyl-2,4-dimethylanilino)fluoran, 2-benzilamino-6-(N-methyl-p-toluidino)fluoran, 2-bromo-6-diethylaminofluoran, 2-chloro-3-methyl-6-diethylaminofluran, 2-chloro-6-(N-ethyl-N-isoamylamino)fluoran, 2-chloro-6-dipropylaminofluoran, 2-diethylamino-6-(N-ethyl-p-toluidino)fluoran, 2-diethylamino-6-(N-methyl-p-toluidino)fluoran, 2-dimethylamino-6-(N-ethylanilino) fluoran, 2-dimethylamino-6-(N-methylanilino)fluoran, 2-dipropylamino-6-(N-ethylanilino)fluoran, 2-dioropylamino-6-(N-methylanilino)fluoran, 2-ethylamino-6-(N-ethyl-2,4-dimethylanilino)fluoran, 2-ethylamino-6-(N-methyl-p-toluidino)fluoran, 2-methylamino-6-(N-ethylanilino)fluoran, 2-methylamino-6-(N-methyl-2,4-dimethylanilino)fluoran, 2-methylamino-6-(N-methylanilino)fluoran, 2-methylamino-6-(N-propylanilino)fluoran, 3-(1-ethyl-2-methylindole-3-yl)-3-(2-ethoxy-4-diethylaminophenyl)-4-azaphthalide, 3-(1-ethyl-2-methylindole-3-yl)-3-(2-ethoxy-4-diethylaminophenyl)-7-azaphthalide, 3-(1-ethyl-2-methylindole-3-yl)-3-(2-methyl-4-diethylaminophenyl)-4-azaphthalide, 3-(1-ethyl-2-methylindole-3-yl)-3-(2-methyl-4-diethylaminoohenyl)-7-azaohthalide, 3-(1-ethyl-2-methylindole-3-yl)-3-(4-diethylaminophenyl)-4-azaphthalide, 3-(1-ethyl-2-methylindole-3-yl)-3-(4-N-n-amyl-N-methylaminophenyl)-4-azaphthalide, 3-(1-methyl-2-methylindole-3-yl)-3-(2-hexyloxy-4-diethylaminophenyl)-4-azaphthalide, 3-(1-ethyl-2-methylindole-3-yl)-3-(2-ethoxy-4-diethylaminophenyl)-4-azaphthalide, 3-(N-cyclohexyl-N-methylamino)-6-methyl-7-phenylaminofluoran, 3-(N-ethyl-N-isoamylamino)-6-methyl-7-phenylaminofluoran, 3-(N-ethyl-p-toluidino)-6-methyl-7-phenylaminofluoran, 3,3-bis(2-ethoxy-4-diethylaminghenyl)-4-azaphtalide, 3,3-bis(2-ethoxy-4-diethylaminohenyl)-7-azaohthalide, 3,6-dibutoxyfluoran, 3-bromo-6-cyclohexylaminofluoran, 3-dibutylamino-7-(o-chlorophenylamino)fluoran, 3-diethylamino-5-methyl-7-dibenzylaminofluoran, 3-diethylamino-6-(m-trifluoromethylanilino)fluoran, 3-diethylamino-6,7-dimethylfuoran, 3-diethylamino-7-(2-carbomethoxy-ohenylamino)fluoran, 3-diethylamino-7-(N-acetyl-N-methylamino)fluoran, 3-diethylamino-7-(N-chloroethyl-N-methylamino)fluoran, 3-diethylamino-7-(N-methyl-N-benzylamino)fluoran, 3-diethylamino-7-(o-chlorophenylamino)fluoran, 3-diethylamino-7-chlorofluoran, 3-diethylamino-7-dibenzylaminofluoran, 3-diethylamino-7-diethylaminofluoran, 3-diethylamino-7-N-methylaminofluoran, 3-dimethylamino-6-methoxylfluoran, 3-dimethylamino-7-methoxyfluoran, 3-methyl-6-(N-ethyl-p-toluidino)fluoran, 3-piperidino-6-methyl-7-phenylaminofluoran, 3-pyrrolidino-6-methyl-7-p-butylphenylaminofluoran, 3-pyrrolidino-6-methyl-7-phenylaminofluoran, 2-anilino-3-methyl-6-(di-n-amylamino)fluoran, 3-(N-ethyl-p-toluidino)-6-methyl-7-anilinofluoran, 3-(N-ethyl-N-isoamylamino)-6-methyl-7-anilinofluoran, 3-diethylamino-6-methyl-7-(o,p-dimethylanilino)fluorane, 3-pyrrolidino-6-methyl-7-anilinofluoran, 3-piperidino-6-methyl-7-anilinofluoran, 3-(N-cyclohexyl-N-methylamino)-6-methyl-7-anilinofluoran, 3-diethylamino-7-(m-trifluoromethylanilino) fluoran, 3-dibutylamino-6-methyl-7-anilinofluoran, 3-diethylamino-6-chloro-7-anilinofluoran, 3-dibutylamino-7-(o-chloroanilino) fluoran, 3-diethylamino-7-(o-chloroanilino)fluoran 3-di-n-pentylamino-6-methyl-7-anilinofluoran, 3-di-n-butylamino-6-methyl-7-anilinofluoran, 3-(n-ethyl-n-isopentylamino)-6-methyl-7-anilinofluoran, 3-pyrrolidino-6-methyl-7-anilinofluoran, 1(3H)-isobenzofluranone, and 4,5,6,7-tetrachloro-3, 3-bis[2-[4-(dimethylamino)phenyl]-2-(4-methoxyphenyl) ethenyl]fluoran.

2. The optical recording system according to claim 1 wherein the marking light source provides light having a wavelength between 380 nm and 420 nm.

3. The optical recording system according to claim 1 wherein an unmarked portion of the markable coating is transparent at the wavelength of the marking light source.

4. The optical recording system according to claim 1, the matrix further comprising a radiation absorber.

5. The optical recording system according to claim 4 wherein the radiation absorber has a peak absorbance at wavelengths between 400 and 500 nm.

6. The optical recording system according to claim 1, further including a sensor for detecting an optical mark on said optical data recording medium.

7. The optical recording system according to claim 1, further including a processor for controlling a position of the disc.

8. A method of making an optical data recording medium, comprising:
a) providing a substrate; and
b) providing a markable coating on said substrate, said markable coating being an optical recording layer and having a thickness less than 1 μm and comprising:
a matrix; and
a color-forming agent included in the matrix and comprising a leuco dye and developer;
wherein said leuco dye is selected to change from high reflectance of radiation with wavelengths between 400 and 500 nm to low reflectance of radiation with wavelengths between 400 and 500 nm when activated by an application of energy above a threshold level;
wherein said color-forming agent includes particles having an average particle size that is less than one-half a wavelength of a marking light source used to apply the energy above the threshold level;
wherein the leuco dye is chosen from: 1,2-benzo-6-(N-ethyl-N-toluidino)fluoran, 1,2-benzo-6-(N-methyl-N-cyclohexylamino)fluoran, 1,2-benzo-6-dibutylaminofluoran, 1,2-benzo-6-diethylaminofluran, 2-(.alpha.-phenylethylamino)-6-(N-ethyl-p -toluidino)fluoran, 2-(2,3-dichloroanilino)-3-chloro-6-diethylaminofluoran, 2-(2,4-dimethylanilino)-3-methyl-6-diethylaminofluoran, 2-(di-p-methylbenzilamino)-6-(N-ethyl-p-toluidino)fluoran, 2-(m-trichloromethylanilino)-3-methyl-6-(N-cyclohexyl-N-methylamino)fluoran, 2-(m-trichloromethylanilino)-3-methyl-6-diethylanimofluoran, 2-(m-trifluoromethylaniline)-6-diethylaminofluoran, 2-(m-trifluoromethylanilino)-3-chloro-6-diethylaminofluran, 2-(m-trifluoromethylanilino)-3-methyl-6-diethylanimofluoran, 2-(N-ethyl-p-toluidino)-3-methyl-6-(N-ethylanilino)fluoran, 2-(N-ethyl-p-toluidino)-3-methyl-6-(N-propyl-p-toluidino) fluoran, 2-(o-chloroanilino)-3-chloro-6-diethlaminofluran, 2-(o-chloroanilino)-6-dibutylaminofluoran, 2-(o-chloroanilino)-6-diethylaminofluoran, 2-(p-acetylanilino)-6-(N-n-amyl-N-n-butylamino)fluoran, 2,3-dimethyl-6-dimethylaminofluoran, 2-amino-6-(N-ethyl-2,4-dimethylanilino)fluoran, 2-amino-6-(N-ethylanilino)fluoran, 2-amino-6-(N-ethyl-p-chloroanilino)fluoran, 2-amino-6-(N-ethyl-p-ethylanilino)fluoran, 2-amino-6-(N-ethyl-p-toluidino)fluoran, 2-amino-6-(N-methyl-2,4-dimethylanilino)fluoran, 2-amino-6-(N-methylanilino)fluoran, 2-amino-6-(N-methyl-p-chloroanilino) fluoran, 2-amino-6-(N-methyl-p-ethylanilino)fluoran, 2-amino-6-(N-methyl-p-toluidino)fluoran, 2-amino-6-(N-propyl-2,4-dimethylanilino)fluoran, 2-amino-6-(N-propylanilino)fluoran, 2-amino-6-(N-propyl-p-chloroanilino)fluoran, 2-amino-6-(N-propyl-p-ethylanilino) fluoran, 2-amino-6-(N-propyl-p-toluidino)fluoran, 2-anilino-3-methyl-6-(N-cyclohexyl-N-methylamino) fluoran, 2-anilino-3-methyl-6-(N-ethyl--N-isoamylamino)fluoran , 2-anilino-3-methyl-6-(N-ethyl-N-p-benzyl)aminofluoran, 2-anilino-3-methyl-6-(N-ethyl-N-propylamino)fluoran, 2-anilino-3-methyl-6-(N-isoamyl-N-ethylamino)fluoran, 2-anilino-3-methyl-6-(N-isobutyl-methyl amino)fluoran, 2-anilino-3-methyl-6-(N-isopropyl-methyl amino)fluoran, 2-anilino-3-methyl-6-(N-methyl-p-toluidino-)fluoran, 2-anilino-3-methyl-6-(N-n-amyl-N-ethylamino)fluoran, 2-anilino-3-methyl-6-(N-n-amyl-N-methylamino)fluoran, 2-anilino-3-methyl-6-(N-n-propyl-N-isopropylamino) fluoran, 2-anilino-3-methyl-6-(N-n-propyl-N-methylamino)fluoran, 2-anilino-3-methyl-6-(N-sec-butyl-N-methylamino)fluoran, 2-anilino-3-methyl-6-diethylaminofluoran, 2-anilino-3-methyl-6-di-n-butylaminofluoran, 2-anilino-6-(N-n-hexyl-N-ethylamino)fluoran, 2-benzilamino-6-(N-ethyl-2,4-dimethylanilino)fluoran, 2-benzilamino-6-(N-ethyl-p-toluidino)fluoran, 2-benzilamino-6-(N-methyl-2,4-dimethylanilino)fluoran, 2-benzilamino-6-(N-methyl-p-toluidino)fluoran, 2-bromo-6-diethylaminofluoran, 2-chloro-3-methyl-6-diethylaminofluran, 2-chloro-6-(N-ethyl-N-isoamylamino)fluoran, 2-chloro-6-dipropylaminofluoran, 2-diethylamino-6-(N-ethyl-p-toluidino) fluoran, 2-diethylamino-6-(N-methyl-p-toluidino) fluoran, 2-dimethylamino-6-(N-ethylanilino)fluoran, 2-dimethylamino-6-(N-methylanilino)fluoran, 2-dipropylamino-6-(N-ethylanilino)fluoran, 2-dipropylamino-6-(N-methylanilino)fluoran, 2-ethylamino-6-(N-ethyl-2,4-dimethylanilino)fluoran, 2-ethylamino-6-(N-methyl-p-toluidino)fluoran, 2-methylamino-6-(N-ethylanilino)fluoran, 2-methylamino-6-(N-methyl-2,4-dimethylanilino)fluoran, 2-methylamino-6-(N-methylanilino)fluoran, 2-methylamino-6-(N-propylanilino)fluoran, 3-(1-ethyl-2-methylindole-3-yl)-3-(2-ethoxy-4-diethylaminophenyl)-4-azaphthalide, 3-(1-ethyl-2-methylindole-3-yl)-3-(2-ethoxy-4-diethylaminophenyl)-7-azaphthalide, 3-(1-ethyl-2-methylindole-3-yl)-3-(2-methyl-4-diethylaminophenyl)-4-azaphthalide, 3-(1-ethyl-2-methylindole-3-yl)-3-(2-methyl-4-diethylaminophenyl)-7-azaphthalide, 3-(1-ethyl-2-methylindole-3-yl)-3-(4-diethylaminophenyl)-4-azaphthalide, 3-(1-ethyl-2-methylindole-3-yl)-3-(4-N-n-amyl-N-methylaminophenyl)-4-azaphthalide, 3-(1-methyl-2-methylindole-3-yl)-3-(2-hexyloxy-4-diethylaminophenyl)-4-azaphthalide, 3-(1-ethyl-2-methylindole-3-yl)-3-(2-ethoxy-4-diethylaminophenyl)-4-azaphthalide, 3-(N-cyclohexyl-N-methylamino)-6-methyl-7-phenylaminofluoran, 3-(N-ethyl-N-isoamylamino)-6-methyl-7-phenylaminofluoran, 3-(N-ethyl-p-toluidino)-6-methyl-7-phenylaminofluoran, 3,3-bis(2-ethoxy-4-diethylaminphenyl)-4-azaphthalide, 3,3-bis(2-ethoxy-4-diethylaminphenyl)-7-azaphthalide, 3,6-dibutoxyfluoran, 3-bromo-6-cyclohexylaminofluoran, 3-dibutylamino-7-(o-chlorophenylamino)fluoran, 3-diethylamino-5-methyl-7-dibenzylaminofluoran, 3-diethylamino-6-(m-trifluoromethylanilino)fluoran, 3-diethylamino-6,7-dimethylfluoran, 3-diethylamino-7-(2-carbomethoxyphenylamino)fluoran, 3-diethylamino-7-(N-acetyl-N-methylamino)fluoran, 3-diethylamino-7-(N-chloroethyl-N-methylamino)fluoran, 3-diethylamino-7-(N-methyl-N-benzylamino)fluoran, 3-diethylamino-7-(o-chlorophenylamino)fluoran, 3-diethylamino-7-chlorofluoran, 3-diethylamino-7-dibenzylaminofluoran, 3-diethylamino-7-diethylaminofluoran, 3-diethylamino-7-N-methylaminofluoran, 3-dimethylamino-6-methoxylfluoran, 3-dimethylamino-7-methoxyfluoran, 3-methyl-6-(N-ethyl-p-toluidino)fluoran, 3-piperidino-6-methyl-7-phenylaminofluoran, 3-pyrrolidino-6-methyl-7-p-butylphenylaminofluoran, 3-pvrrolidino-6-methyl-7-phenylaminofluoran, 2-anilino-3-methyl-6-(di-n-amylamino)fluoran, 3-(N-ethyl-p-toluidino)-6-methyl-7-anilinofluoran, 3-(N-ethyl-N-isoamylamino)-6-methyl-7-anilinofluoran, 3-diethylamino-6-methyl-7-(o,p-dimethylanilino)fluorane, 3-pyrrolidino-6-methyl-7-anilinofluoran, 3-piperidino-6-methyl-7-anilinofluoran, 3-(N-cyclohexyl-N-methylamino)-6-methyl-7-anilinofluoran, 3-diethylamino-7-(m-trifluoromethylanilino) fluoran, 3-dibutylamino-6-methyl-7-anilinofluoran, 3-diethylamino-6-chloro-7-anilinofluoran, 3-dibutylamino-7-(o-chloroanilino) fluoran, 3-diethylamino-7-(o-chloroanilino)fluoran 3-di-n-pentylamino-6-methyl-7-anilinofluoran, 3-di-n-butylamino-6-methyl-7-anilinofluoran, 3-(n-ethyl-n-isopentylamino)-6-methyl-7-anilinofluoran, 3-pyrrolidino-6-methyl-7-anilinofluoran, 1(3H)-isobenzofluranone, and 4,5,6,7-tetrachloro-3,3-bis [2-[4-(dimethylamino)phenyl]-2-4-methoxyphenypethenyl] fluoran.

9. The method according to claim 8 wherein step b) includes providing a markable coating that includes a radiation absorber having a peak absorption wavelength between 380 nm and 420 nm.

10. The method according to claim 8 wherein step b) includes providing a markable coating that includes a radiation absorber having a peak absorption wavelength between 300 nm and 980 nm.

11. The method according to claim 8 wherein step b) includes providing a color-forming agent that comprises particles having an average diameter less than 250 nm.

12. The method according to claim 8 wherein step b) includes providing an unmarked markable coating that is transparent at the wavelengths between 400 and 500 nm.

* * * * *

UNITED STATES PATENT AND TRADEMARK OFFICE
CERTIFICATE OF CORRECTION

PATENT NO.        : 7,968,166 B2
APPLICATION NO.   : 11/668438
DATED             : June 28, 2011
INVENTOR(S)       : Makarand P. Gore It is certified that error appears in the above-identified patent and that said Letters Patent is hereby corrected as shown below:

In column 16, line 26, in Claim 1, delete "one-half a" and insert -- one-half of a --, therefor.

In column 16, line 35, in Claim 1, delete "diethylaminofluran," and insert -- diethylaminofluoran, --, therefor.

In column 16, line 37, in Claim 1, delete "diethylaminofluran," and insert -- diethylaminofluoran, --, therefor.

In column 16, line 43, in Claim 1, delete "diethylanimofluoran" and insert -- diethylaminofluoran --, therefor.

In column 16, line 45, in Claim 1, delete "diethylaminofluran" and insert -- diethylaminofluoran --, therefor.

In column 16, line 46, in Claim 1, delete "diethylanimofluoran" and insert -- diethylaminofluoran --, therefor.

In column 16, lines 49-50, in Claim 1, delete "diethlaminofluran" and insert -- diethylaminofluoran --, therefor.

In column 17, line 22, in Claim 1, delete "diethylaminofluran" and insert -- diethylaminofluoran --, therefor.

In column 17, lines 28-29, in Claim 1, delete "dioropylamino" and insert -- dipropylamino --, therefor.

In column 17, line 41, in Claim 1, delete "azaohthalide" and insert -- azaphthalide --, therefor.

Signed and Sealed this
Eighteenth Day of December, 2012

David J. Kappos
*Director of the United States Patent and Trademark Office*

CERTIFICATE OF CORRECTION (continued)
U.S. Pat. No. 7,968,166 B2

In column 17, line 52, in Claim 1, delete "diethylaminghenyl" and insert -- diethylaminophenyl --, therefor.

In column 17, line 53, in Claim 1, delete "diethylaminohenyl" and insert -- diethylaminophenyl --, therefor.

In column 17, lines 53-54, in Claim 1, delete "azaohthalide" and insert -- azaphthalide --, therefor.

In column 17, line 59, in Claim 1, delete "dimethylfuoran" and insert -- dimethylfluoran --, therefor.

In column 17, line 59-60, in Claim 1, delete "carbomethoxy-ohenylamino" and insert -- carbomethoxy-phenylamino --, therefor.

In column 18, lines 1-2, in Claim 1, delete "methoxylfluoran" and insert -- methoxyfluoran --, therefor.

In column 18, line 10, in Claim 1, delete "fluorane" and insert -- fluoran --, therefor.

In column 18, line 57, in Claim 8, delete "one-half a" and insert -- one-half of a --, therefor.

In column 18, line 63, in Claim 8, delete "diethylaminofluran" and insert -- diethylaminofluoran --, therefor.

In column 18, line 65, in Claim 8, delete "diethylaminofluran" and insert -- diethylaminofluoran --, therefor.

In column 19, line 4, in Claim 8, delete "diethylanimofluoran" and insert -- diethylaminofluoran --, therefor, In column 19, line 6, in Claim 8, delete "diethylaminofluran" and insert -- diethylaminofluoran --, therefor.

In column 19, line 8, in Claim 8, delete "diethylanimofluoran" and insert -- diethylaminofluoran --, therefor.

In column 19, line 11, in Claim 8, delete "diethlaminofluran" and insert -- diethylaminofluoran --, therefor.

In column 19, line 28, in Claim 8, delete "fluoran ," and insert -- fluoran, --, therefor.

In column 19, line 47, in Claim 8, delete "diethylaminofluran" and insert -- diethylaminofluoran --, therefor.

CERTIFICATE OF CORRECTION (continued)
U.S. Pat. No. 7,968,166 B2

In column 20, line 11, in Claim 8, delete "diethylaminphenyl'" and insert -- diethylaminophenyl --, therefor.

In column 20, line 12, in Claim 8, delete "diethylaminphenyl" and insert -- diethylaminophenyl --, therefor.

In column 20, line 18, in Claim 8, delete "dimethylfuoran" and insert -- dimethylfluoran --, therefor.

In column 20, line 27, in Claim 8, delete "methoxylfluoran" and insert -- methoxyfluoran --, therefor.

In column 20, line 30, in Claim 8, delete "pvrrolidino" and insert -- pyrrolidino --, therefor.

In column 20, line 35, in Claim 8, delete "fluorane" and insert -- fluoran --, therefor.

In column 20, line 48, in Claim 8, delete "methoxyphenypethenyl" and insert -- methoxyphenyl)ethenyl --, therefor.